(12) United States Patent
Metzger et al.

(10) Patent No.: US 6,886,418 B2
(45) Date of Patent: May 3, 2005

(54) INTEGRALLY FORMED FLEXURE PIVOT FOR A FORCE-MEASURING DEVICE, AND FORCE-TRANSFER MECHANISM WITH THE FLEXURE PIVOT

(75) Inventors: Andreas Metzger, Männedorf (CH); Hans-Rudolf Burkhard, Wile (CH)

(73) Assignee: Mettler-Toledo GmbH, Greifensee (CH)

( * ) Notice: Subject to any disclaimer, the term of this patent is extended or adjusted under 35 U.S.C. 154(b) by 0 days.

(21) Appl. No.: 10/814,242

(22) Filed: Apr. 1, 2004

(65) Prior Publication Data

US 2004/0182179 A1 Sep. 23, 2004

Related U.S. Application Data

(63) Continuation of application No. PCT/IB02/03973, filed on Sep. 26, 2002.

(30) Foreign Application Priority Data

Oct. 2, 2001 (DE) .......................................... 101 48 762

(51) Int. Cl.⁷ ................................................ G01L 1/04
(52) U.S. Cl. ............... 73/862.631; 73/862; 73/862.637; 73/862.621
(58) Field of Search .............. 73/862, 862.621–862.642

(56) References Cited

U.S. PATENT DOCUMENTS

| | | | | |
|---|---|---|---|---|
| 4,799,561 A | * | 1/1989 | Komoto ...................... | 177/229 |
| 5,340,951 A | * | 8/1994 | Hungerbuhler et al. | 73/862.621 |
| 5,641,948 A | * | 6/1997 | Burkhard ................ | 73/862.621 |
| 5,866,854 A | * | 2/1999 | Emery et al. .................. | 177/50 |
| 5,923,000 A | * | 7/1999 | Tschopp et al. ............. | 177/154 |
| 6,232,567 B1 | * | 5/2001 | Bonino et al. ......... | 73/862.621 |
| 6,414,252 B1 | * | 7/2002 | Emery et al. ................ | 177/229 |

FOREIGN PATENT DOCUMENTS

| | | |
|---|---|---|
| DE | 81 35 182.8 | 3/1982 |
| DE | 40 22 146 A1 | 1/1991 |
| DE | 38 33 221 C2 | 1/1997 |
| EP | 0 518 202 A1 | 12/1992 |
| EP | 1 054 242 A2 | 5/2000 |
| EP | 1 083 420 A2 | 8/2000 |

* cited by examiner

Primary Examiner—Edward Lefkowitz
Assistant Examiner—Alandra Ellington
(74) Attorney, Agent, or Firm—Burns, Doane, Swecker & Mathis, L.L.P.

(57) ABSTRACT

A flexure pivot in the form of a thin material connection formed as a result of adjacent material-free spaces is disclosed, as is a force-transfer mechanism for use in a force-measuring device, in particular a balance, containing at least one flexure pivot of the aforementioned type. The force-transfer mechanism has a stationary portion with a lever arrangement comprising at least one reduction lever and serving to transmit a force to a measuring transducer, and it further has at least one coupling element serving to introduce an input force into the lever arrangement, the coupling element being stiff against lengthwise deformation but flexible with regard to bending and having at least one thin material connection. The at least one lever is supported on the stationary portion and/or on a preceding lever by a flexible fulcrum pivot having a thin material connection. At least one thin material connection zone of a thin material connection is delimited by concave-shaped surfaces facing material-free spaces, and at least one of the material-free spaces delimiting the thin material connection zone has a shape that creates a constriction of the thin material connection zone.

52 Claims, 5 Drawing Sheets

INTEGRALLY FORMED FLEXURE PIVOT FOR A FORCE-MEASURING DEVICE, AND FORCE-TRANSFER MECHANISM WITH THE FLEXURE PIVOT

CROSS REFERENCE TO RELATED APPLICATIONS

This application claims priority under 35 U.S.C. §119 to German Application No. 101 48 762.2 filed in Germany on 2 Oct. 2001, and as a continuation application under 35 U.S.C. §120 to PCT/IB02103973 filed as an International Application on 26 Sep. 2002 designating the U.S., the entire contents of which are hereby incorporated by reference in their entireties.

BACKGROUND

A flexure pivot formed as a thin material connection between solid material portions of a body is disclosed. The thin connection includes a narrow web bounded by adjacent material-free spaces. A force-transfer mechanism for a force-measuring device, in particular a balance, is also disclosed with at least one flexure pivot of the aforementioned kind. The force-transfer mechanism has a stationary portion, a lever arrangement with at least one lever serving to transmit forces to a measuring transducer, and at least one coupling element serving to introduce an input force into the lever arrangement. The coupling element is stiff against elongation but yields to bending, having at least one thin material connection. The at least one lever is supported on the stationary portion or on a preceding lever by means of a flexible fulcrum pivot having a thin material connection. At least one zone of a thin material connection is delimited by a concave-shaped surface facing material-free spaces.

Flexure pivots in the form of thin material connections meeting the foregoing description are generated by either a localized removal of material or by a forming process. They are distinguished by a high degree of flexibility and small reactive forces for small angular deflections about the pivot axis in combination with a high degree of rigidity against forces and torques acting in other directions. These flexure pivots are used predominantly in precision instruments, and exemplary materials for them are aluminum alloys.

A force-transfer mechanism with a flexure pivot in the form of a thin material connection is often used in force-measuring devices, particularly in balances in which the force generated by a load on the weighing pan is converted into an electrical signal through a transducer based on the principle of electromagnetic force compensation. The purpose of the force-transfer mechanism is to reduce the weight force generated for example by the load on the weighing pan of a balance with a sufficient lever ratio so that the force at the other end of the mechanism can be converted into a measuring signal compatible with the available load range of a force-measuring transducer. The angular deflections of the reduction levers and of their flexure pivots are known to be very small in force-measuring devices that function according to the principle of electromagnetic compensation.

A force-measuring device that meets the foregoing description has a parallelogram with two parallel-guiding members connecting a vertically movable leg of the parallelogram to a stationary leg that forms the fixed portion of the parallelogram. A coupling element that is rigid relative to longitudinal forces and at the same time flexibly bendable introduces the force from the parallelogram into a force-reducing lever mechanism that includes at least one lever and is supported on the fixed portion of the parallelogram. A coupling element is in most cases delimited at each end by a thin material connection defining the point of force introduction into the coupling element. If the lever mechanism has more than one lever, the lever arms following each other in the lever chain are connected in each case by a coupling element. Each lever is supported either on the fixed portion of the parallelogram or on a preceding lever by a fulcrum in the form of a flexure pivot.

A device of this type is described in EP A 0 518 202. A force-measuring device with at least one force-reduction lever and at least one coupling element that is stiff in the lengthwise direction but flexibly bendable is made of a monolithic block of material. The material-free spaces are formed as narrow line cuts traversing the material block. The cutting surfaces of the narrow line cuts, which can be produced by spark erosion, are perpendicular to the plane of rotation of the at least one reduction lever. The material portion that forms the at least one lever is connected to the stationary portion of the material block only through a flexure pivot that forms the lever fulcrum and through a coupling element that applies the force to one arm of the lever. The coupling element and the fulcrum are likewise formed integrally out of the monolithic block.

A weighing transducer based on the principle of electromagnetic force compensation is disclosed in EP A 1 054 242, in which the essential parts, i.e., the parallelogram, the lever mechanism, the coupling elements and the fulcrums, are machined out of a single block of material in a configuration where a stationary base portion of the material block extends into the space between the two parallel-guiding members and forms the fulcrum support for the first reduction lever. At least a part of at least one lever is split up into two levers and at least one coupling element is configured as twin coupling elements that are arranged symmetrically on both sides of a projecting cantilever portion of the stationary base part of the material block. The shaping of the individual components of the weighing transducer from a single material block can be accomplished either by milling or by an erosion process. It is also possible to use a casting process for the production of a weighing transducer of this kind.

The measuring resolution and weighing accuracy achievable with the force- and weighing transducers of the foregoing description are limited because the force-transmitting lever system has a spring characteristic causing a reactive force that opposes a deflection of the mechanism. The spring characteristic can be expressed as a spring constant that is determined primarily by the lever fulcrums and the force-introducing end portions of the coupling elements which have the form of flexure pivots. The main contribution to the aforementioned reactive force comes from the lever immediately ahead of the electromagnetic force-compensation coil. The flexure pivots of the levers and coupling elements are often configured as thin material connections delimited on both sides by concave, arcuate surfaces facing material-free spaces. The arcuate surfaces often have a substantially constant radius, which simplifies the manufacturing process.

An exemplary way of reducing the spring constant of a flexure pivot is to reduce the cross-sectional profile of the thin material connection that forms the flexure pivot. One possibility is to reduce the width of the thin material connection in the direction perpendicular to the plane of rotation of the at least one reduction lever. This concept is described, e.g., in EP A 0 518 202. The reduction in width is likewise achieved by dividing the levers with their fulcrums and coupling elements in the weighing transducer according to EP A 1 054 242. Particularly for the lever fulcrums and/or the end portions of the coupling elements, the splitting-up can be achieved with a dead-end bore hole from the top of a material block (e.g., in accordance with EP A 0 518 202) as disclosed in EP A 1 083 420. A dead-end bore hole can also enter the material block from one of the shorter surfaces that are perpendicular to the plane of rotation of the at least one reduction lever.

As another possibility, it is also possible to make the flexure pivot thinner, i.e., to reduce the profile dimension of the flexure pivot in the plane of rotation of the reduction lever.

In particular, for thin material connections that are delimited by concave surfaces facing material-free spaces with a substantially constant and relatively small radius, the last-mentioned concept leads to a thin flexure pivot with a well-defined center of rotation. However, if a flexure pivot of this kind is exposed to a shock from the outside, the thin portion will easily break. The thinner or narrower the profile of the thin material connection and the stronger the surface curvature towards the adjacent material-free portions, the greater is the risk of breakage.

To solve the foregoing problem, flexure pivots have been disclosed with an elongated shape of the thin material connection. This configuration makes the flexure pivot significantly less sensitive to shock loads from the outside, which may be caused for example by an impact hitting the force-measuring device that contains the flexure pivot. By deflecting sideways, an elongated thin material connection can yield to a shock without breaking, and the lateral deflection is in most cases reversible. A similarly high degree of shock resistance can be achieved with a thin material connection that is delimited on both sides by concave surfaces facing material-free spaces of a constant radius, if the radius is selected large enough. In a further design of a relatively shock-insensitive flexure pivot, the thin material connection is delimited on each side by at least two mutually adjacent concave surfaces facing material-free spaces with approximately constant radii.

The aforementioned concepts for the shape of the thin material connection forming a flexure pivot have the drawback that the center of rotation of the flexure pivot is defined only with a low degree of accuracy.

SUMMARY

A flexure pivot formed by a thin material connection is disclosed, where the flexure pivot is highly insensitive to shocks and has at the same time a well-defined center of rotation.

A flexure pivot formed as a thin material connection joining solid material portions of a body is used in a force-transfer mechanism with a stationary portion, a lever arrangement with at least one lever serving to transmit forces to a measuring transducer, and at least one coupling element serving to introduce an input force into the lever arrangement. The coupling element is stiff against lengthwise deformation but yields to bending, having at least one thin material connection. The at least one lever is supported on the stationary portion and/or on a preceding lever of a lever chain by means of a flexible fulcrum pivot in the form of a thin material connection. The flexure pivot is formed by adjacent material-free spaces and contains at least one thin material connection zone delimited by concave-shaped surfaces facing material-free spaces. At least one of the material-free spaces delimiting the thin material connection zone has a shape that creates a constriction in the thickness of the thin material connection zone.

The constriction causes a further thinning-down of the thin material connection. As a result, the spring constant of the flexure pivot is further reduced and its flexibility is increased. Nevertheless, the flexure pivot remains sufficiently robust to absorb shocks from the outside, because the thin material connection over its entire length has enough elasticity to yield sideways in response to a shock. The center of rotation of the flexure pivot is located in the constricted section of the thin material connection, and its position is therefore accurately defined.

In an advantageous embodiment, the flexure pivot is an integral part of a material block, wherein the flexure pivot is either formed by narrow line cuts that traverse the material block perpendicularly to the main plane of the block or by material-free spaces produced in the block by means of machine tools.

In an exemplary embodiment, the concave-shaped surfaces facing material-free spaces delimiting the thin material connection zone have an elongated shape with at least one depression creating a narrow constriction in the middle of the thin material connection.

A flexure pivot of this kind can be produced by a relatively simple process, because only a small additional amount of material has to be removed to produce the depressions in the material-free spaces that delimit the thin material connection. This can be accomplished either in a second machining operation or in a finishing step that may in many cases be required even in a flexure pivot without the constricted section.

In a further exemplary embodiment of the flexure pivot, the concave-shaped surfaces facing material-free spaces delimiting the thin material connection have an elongated shape, and the constriction of the thin material connection is formed with a constantly narrowing taper towards the middle of the thin material connection zone. A constriction with a constantly narrowing taper towards the middle of the thin material connection represents a further possible embodiment for an elongated flexure pivot delimited by material-free spaces with at least one concave-shaped contour segment.

In another advantageous embodiment of the flexure pivot, each of the material-free spaces that delimit the thin material connection zone is bounded by an arcuate cutout with a first curvature radius in which an arcuate cutout with a second, smaller curvature radius is imbedded.

In other embodiments of a flexure pivot formed by a thin material connection, the arcuate contours of the material-free spaces delimiting the thin material connection contain further arcuate concavities with significantly stronger curvatures.

An exemplary application for the flexure pivot formed by a thin material connection is in a force-transmitting mechanism for a force-measuring device, in particular a balance. A force-transmitting mechanism of this kind has a stationary part, a lever mechanism with at least one force-reduction lever to transmit the force to a measuring sensor, and at least one coupling element that serves to introduce the force into the lever mechanism. The coupling element is stiff against lengthwise deformation but yields to bending, containing at least one thin material connection. The at least one lever is supported on the stationary portion and/or on a preceding lever by means of a flexible fulcrum pivot in the form of a thin material connection. At least one zone of the thin material connections is delimited by concave-shaped surfaces facing material-free spaces, and at least one of the latter has a shape that creates a constriction in the thin material connection.

Exemplary embodiments can provide the benefits of an improved measuring resolution and increased accuracy, for example in a force-measuring device that contains the inventive force-transmitting mechanism. The force-transmitting device is robust in regard to shocks from the outside, as the flexure pivot is able to yield reversibly due to the elongated overall configuration of the thin material connection. As a further advantage, the center of rotation is located within the constricted section of the thin material connection and therefore well defined. With the vastly better defined position of the center of rotation, the sensitivity of the force-measuring device to leveling variations is massively reduced.

In further embodiments, the lever mechanism and the coupling elements are integral portions of a material block, or even the entire force-transmitting mechanism is an integral part of a material block. The material-free spaces are formed either as narrow line cuts traversing the material block perpendicularly relative to the plane of rotation of the at least one reduction lever, and/or as hollow openings produced by machining processes.

In an exemplary embodiment of the force-transmitting mechanism, the lever fulcrums and the force-concentrating end portions of the coupling elements are configured as flexure pivots in which the concave-shaped surfaces facing material-free spaces delimiting the thin material connection zone have a constriction formed with a constantly narrowing taper from the ends towards the middle of the thin material connection.

In a further embodiment, the concave-shaped surfaces facing material-free spaces delimiting a flexure pivot have an elongated shape with at least one depression forming at least one constriction at the center of the thin material connection zone. The constricted section continues into a section with a constant taper towards the center of the thin material connection zone.

In an alternative embodiment, each of the material-free spaces that delimit the thin material connection zone can be bounded by an arcuate cutout with a first curvature radius in which an arcuate cutout with a second, smaller curvature radius is imbedded. This configuration is particularly advantageous, if the material-free spaces of the material block from which a force-transmitting device is shaped are produced in a machining process such as, e.g., milling. In an advantageous further development of the foregoing concept, the arcuate cutouts of the material-free spaces delimiting the thin material connection zone contain further arcuate concavities with significantly stronger curvatures.

In a further advantageous embodiment, the material cross-section of the force-concentrating end portion of the at least one coupling element and of the at least one lever fulcrum is reduced by recesses that are cut into the sides of the material block which are parallel to the plane of rotation of the at least one lever. A reduction in the material profile dimensions can also be produced by cutouts from the middle of the material block, whereby a lever and/or coupling element with or without their associated flexure pivots are divided in two.

BRIEF DESCRIPTION OF THE DRAWINGS

Preferred exemplary embodiments and configurations of the flexure pivot formed as a thin material connection and of an inventive force-transmitting mechanism containing the flexure pivot are described hereinafter with reference to the drawings, wherein.

DETAILED DESCRIPTION

Figure 1:
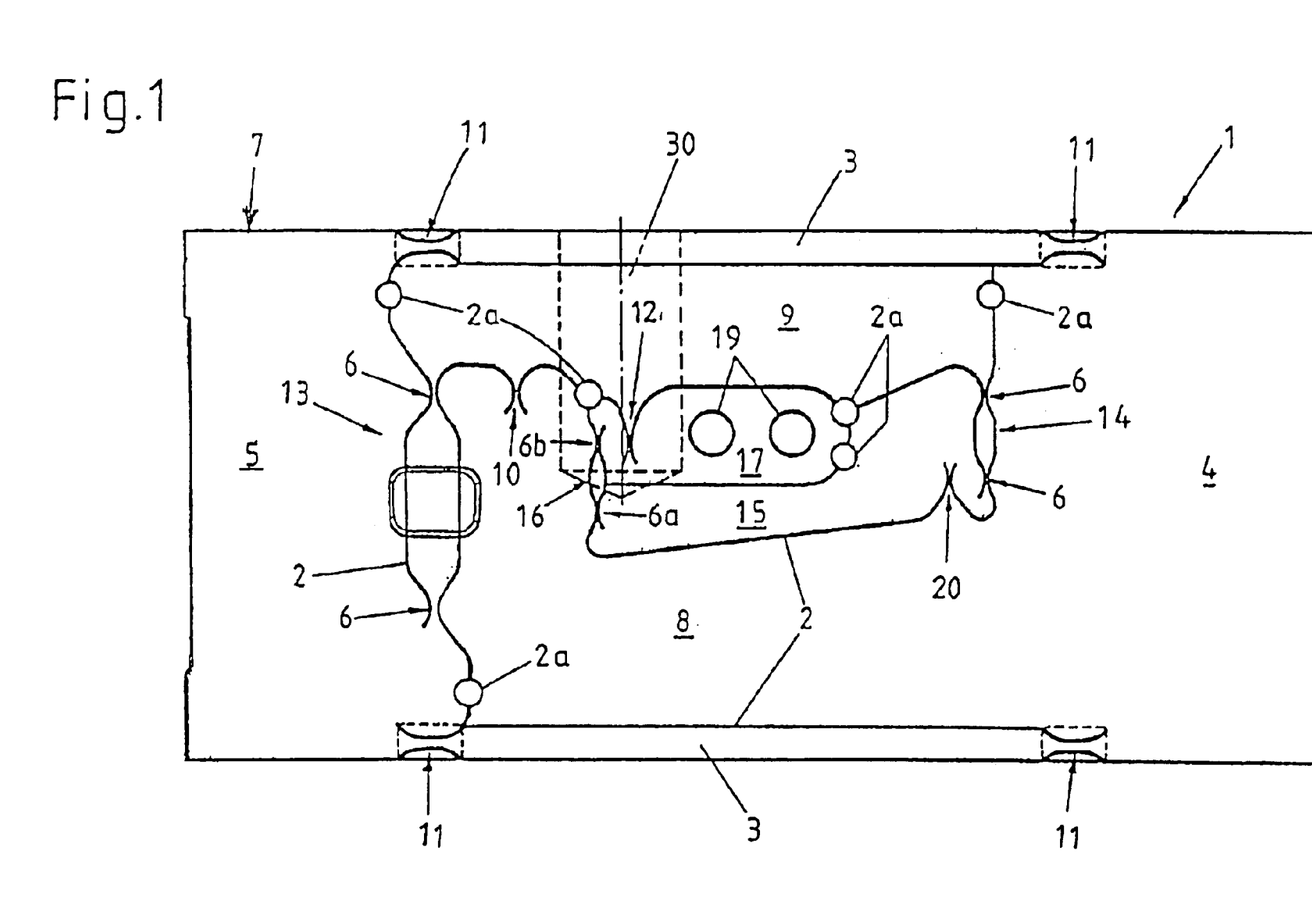
FIG. 1 represents an exemplary force-measuring device with the measuring transducer removed, seen in the direction perpendicular to the plane of the parallelogram.

FIG. 1 represents a side view of a force-transfer mechanism for a force-measuring device with the force-measuring transducer taken off. The force-transfer mechanism is formed of a substantially brick-shaped material block 1, portions of which are separated from each other by material-free spaces in the form of narrow line cuts 2 traversing the material block 1 perpendicularly to its main surfaces. In the planes that run parallel to the main surfaces of the material block 1, the material portions form a parallelogram with upper and lower parallel-guiding members 3, one parallelogram leg forming a stationary portion 4, as well as a vertically movable parallelogram leg 5, wherein the vertical mobility of the movable parallelogram leg 5 is due to the concave-shaped flexure pivots 11 which are delimited by material-free spaces. Material portions in the interior of the material block 1 form a lever mechanism with three serially connected reduction levers 9, 15, 17, whose plane of rotation lies in the parallelogram plane. Thus, the plane of rotation of the reduction levers 9, 15, 17 coincides with the plane of the parallelogram and is parallel to the planes of the largest surfaces of the material block 1.

The movable parallelogram leg 5 serves as the receiving element for a load to be measured, for example a load placed on a weighing pan (not shown) connected to the load-receiving part 7, and is connected to the short lever arm of a first lever 9 through a first coupling element 13 that is rigid relative to a lengthwise deformation but flexible in a bending mode. The first lever 9 has a support fulcrum in the form of a flexure pivot 10 arranged on a cantilevered projection 8 extending from the stationary part 4 into the interior of the material block 1. The longer lever arm of the first lever 9 is connected to the short lever arm of a second lever 15 by way of a second coupling element 14. The second lever 15 is analogously supported by a second fulcrum in the form of a flexure pivot 20 arranged on the cantilevered projection 8. A third lever 17, connected to the second lever by a third coupling element 16, is supported by a third fulcrum in the form of a flexure pivot 12 arranged on the longer lever arm of the first lever 9. The bore holes 19 serve to attach a lever extension (not shown) to the longer lever arm of the third lever 17 to reach a force-compensation device (not shown). This configuration of a force-transfer mechanism offers the advantage of structural strength in a compact design.

The parallelogram, coupling elements, lever mechanism and flexure pivots are delimited by material-free spaces in the form of narrow line cuts 2 in the material block 1. The cuts 2 are produced by, for example, spark erosion with an erosion wire. Bore holes 2a serve to put the erosion wire in place.

The lever fulcrums 10 and 20 are designed as upstanding flexure pivots, while the fulcrum 12 is designed as a hanging flexure pivot by which the third lever 17 is suspended from the first lever 9.

The force-concentrating end portions 6, 6a, 6b of the coupling elements 13, 14 and 16, as well as the flexure-pivoted fulcrums 10, 20, 12 of the levers 9, 15, 17 are configured as thin material connections. The spring constant of the force-transfer mechanism, which determines the position-restoring force and has considerable influence on the accuracy of the balance, is primarily a function of the spring constants of the coupling end portions and the flexure-pivoted fulcrums, in particular those of the third lever 17. The force-concentrating end-portions 6a, 6b of the coupling element 16 as well as the flexure-pivoted fulcrum 12 are therefore designed as thin material connections of the particular configuration as illustrated in detail in FIGS. 2b to 5 representing different exemplary embodiments of the thin material connections used in the aforementioned places. A particularly strong need for the design of the thin material connection exists in the force-concentrating end portion 6b of the coupling element 16 which lies at the same vertical height as the lever fulcrum 12.

The illustrated embodiment of FIG. 1 further has a dead-end bore hole 30 entering from the top of the material block 1, whose bore axis lies in the central plane of the block. The bore hole extends over the portion of the block that contains the third coupling element 16 and the fulcrum 12 of the third lever 17, so that the coupling element and the fulcrum are divided in two and their effective width perpendicular to the plane of lever rotation is reduced, which further contributes to softening the spring characteristics of the affected flexure pivots.

Figure 2A:
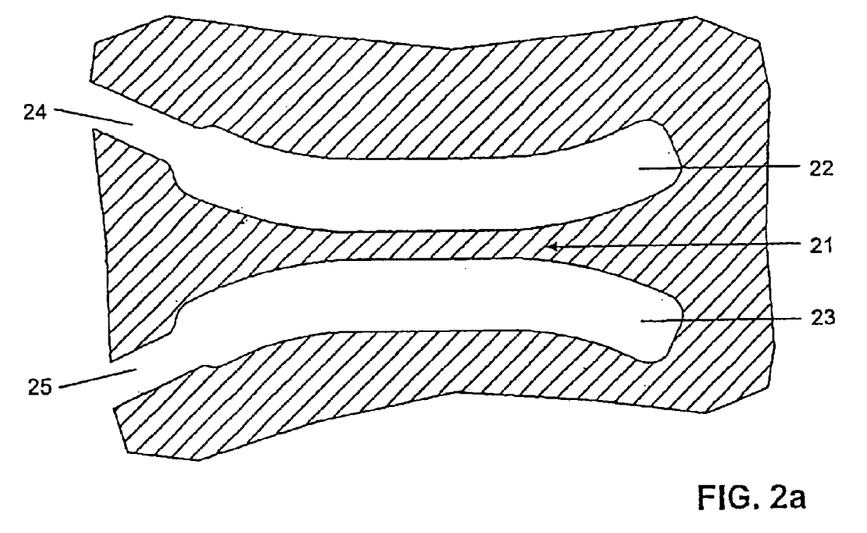
FIG. 2a represents a strongly magnified view of an exemplary thin material connection forming a flexure pivot according to the state of the prior art, seen in a sectional view in the plane of the parallelogram.

For comparison with the thin material connections, which will be described subsequently, FIG. 2a illustrates a thin material connection according to the existing state of the art as it may be used, e.g., in the lever fulcrum 12. The thin material connection generated by spark erosion is about 0.5 to 2 millimeters long and about 50 to 100 micrometers thick. The thin connecting zone 21 is formed by two concave-shaped surfaces of cutting line segments 22 and 23 that are slightly widened in comparison to their continuations 24 and 25 that run as narrow line cuts, e.g., separating the first lever from the third lever. The widening of the cutting line zones 22, 23 is produced by a finishing operation on the surfaces that delimit the thin material connection zone 21. Although not evident from the drawing, the finishing operation has an important purpose. It serves not only for the precise shaping but also for smoothing the surface of the thin material connection.

Due to its relative length and largely uniform width, the thin material connection of FIG. 2a suffers from the problem that the center of rotation of the flexure pivot formed by the thin material connection is not precisely defined, which makes the balance sensitive to out-of-level conditions. On the other hand, a thin material connection of the kind shown in FIG. 2a can respond to a shock force directed horizontally at the weighing cell by yielding sideways and deforming approximately into an s-shape without breaking. The deformation is generally reversible, so that the balance is not damaged by the shock.

Figure 2B:
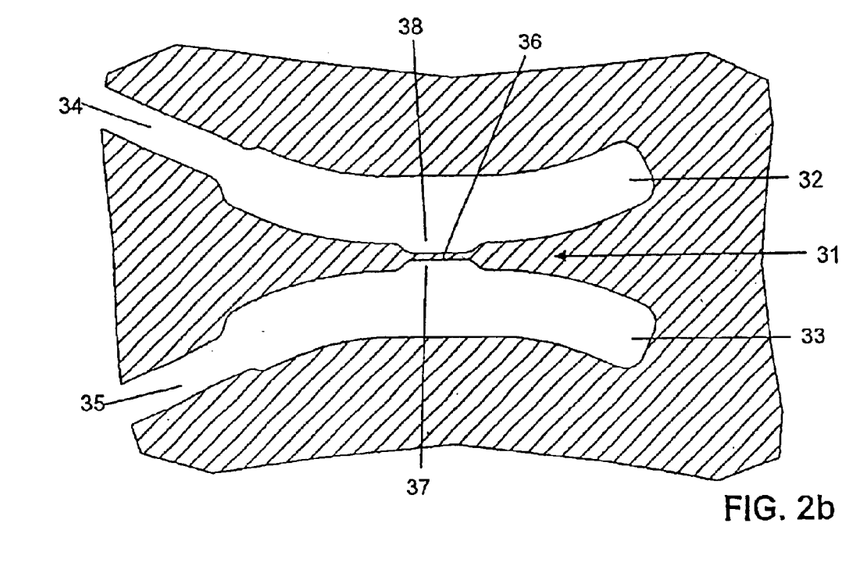
FIG. 2b represents a strongly magnified view of a thin material connection forming an exemplary flexure pivot, seen in a sectional view in the plane of the parallelogram, with depressed contour segments towards both of the material-free spaces that delimit the thin material connection.

The advantage of shock-resistance is maintained with the configuration of the thin material connection. As shown in FIG. 2b, an exemplary improvement includes the use of depressions 37, 38 of the cutting line segments 32, 33. The depressions are produced by removing additional surface material at the center of the elongated thin material connection zone 31, whereby a constricted section 36 with a length of about 0.2 mm to 0.6 mm is formed in the thin material connection zone 31. The thin material connection is thereby further thinned down within a small area, resulting in the desired reduction of the spring constant. On the other hand, the location of the center of rotation is precisely defined as the center of the constricted section in the thin material connection of FIG. 2b.

Figure 2C:
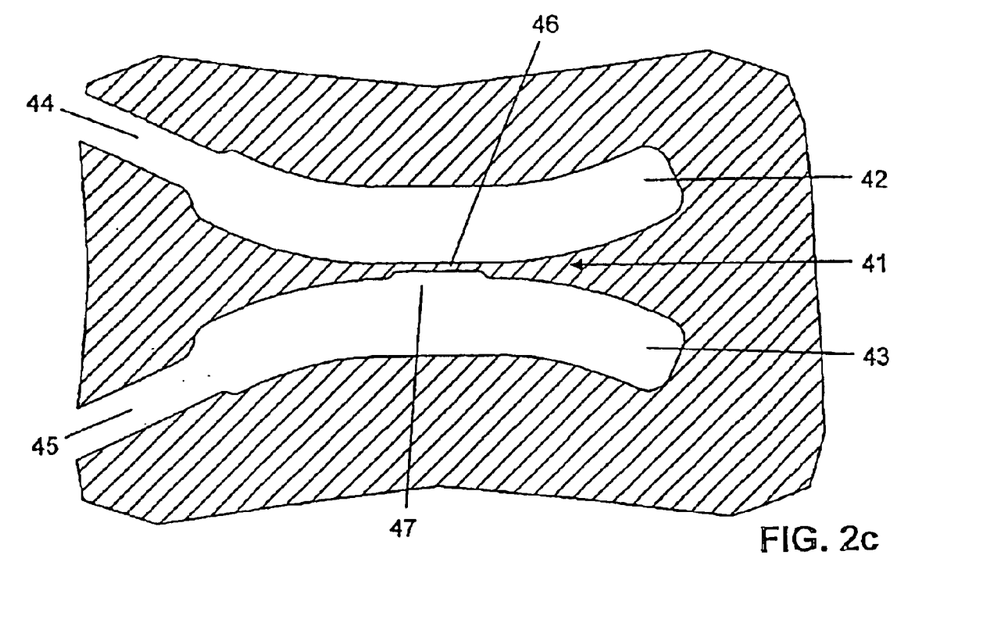
FIG. 2c represents a strongly magnified view of a further exemplary thin material connection seen in a sectional view in the plane of the parallelogram, with a depressed contour segment towards one of the material-free spaces that delimit the thin material connection.

A further exemplary embodiment of a thin material connection is illustrated in FIG. 2c. In this version, only one of the cutting line segments 42, 43 has a depression 47 forming a constricted section 46 of the thin material connection zone 41. This likewise has the result of further thinning down the thin material connection and enhancing the precise definition of the center of rotation.

Figure 2D:
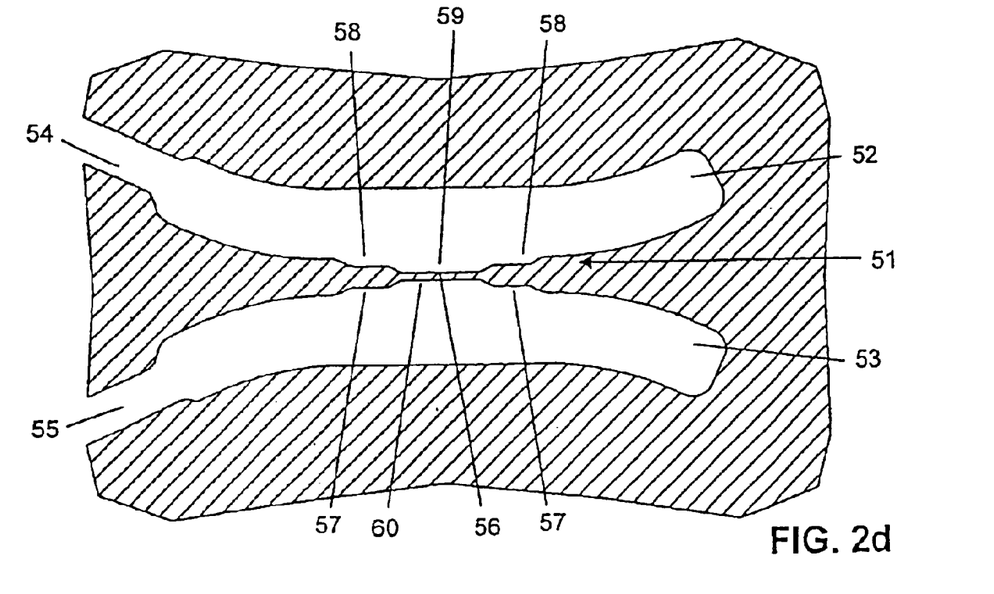
FIG. 2d represents a strongly magnified view of a third exemplary thin material connection seen in a sectional view in the plane of the parallelogram, with further depressed contour segments nested inside each other and facing towards both of the material-free spaces that delimit the thin material connection.

FIG. 2d shows a further developed version of a thin material connection, where the cutting line segments 52, 53 have second depressions 59, 60 nested within first depressions 57, 58. In addition to further narrowing the thin material connection zone 51, this configuration provides an even more precise definition of the center of rotation of the flexure pivot. As is self-evident, the further narrowing of the thin material connection zone 51 could also be achieved with a depression in only one of the concave-shaped cutting line segments 52, 53. Other possible variations could have additional levels of depressions, each nested within a preceding shallower contour segment.

Figure 3:
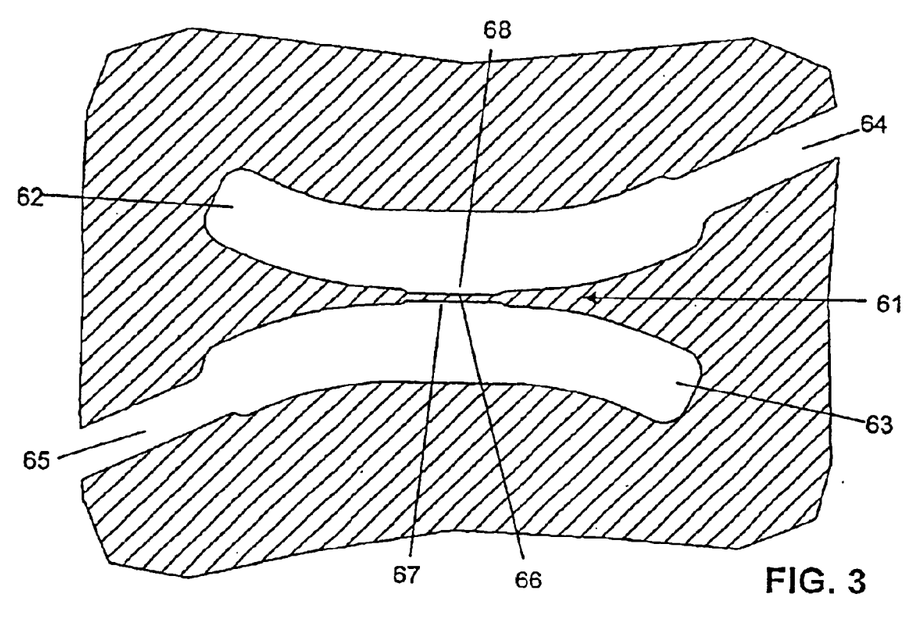
FIG. 3 represents a strongly magnified view of an exemplary embodiment of the thin material connection of FIG. 2b, as seen in a sectional view in the plane of the parallelogram, wherein the line cuts forming the material-free spaces that delimit the thin material connection start out from opposite ends of the flexure pivot.

FIG. 3 illustrates an arrangement of a thin material connection for a flexure pivot, in which the continuations 64, 65 of the cutting line segments 62, 63 start at opposite ends of the thin material connection. Meant only as an example, the constriction 66 of the thin material connection zone 61 is indicated in the same shape as in FIG. 2b, but could of course also have one of the shapes shown in FIGS. 2c and 2d.

Figure 4A:
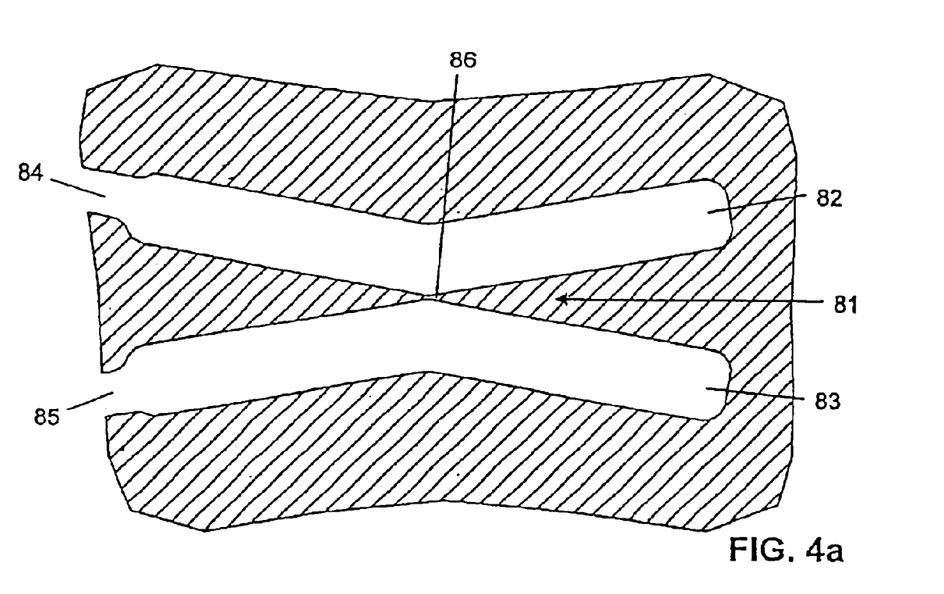
FIG. 4a represents a strongly magnified view of an exemplary embodiment of the thin material connection, as seen in a sectional view in the plane of the parallelogram, configured as a material portion with a constant taper from the ends towards the middle of the thin material connection.

FIG. 4a shows a further variant version of a thin material connection. The cutting line segments 82, 83 delimiting the thin material connection zone 81 in this case define a shape with a constant taper from the ends to the middle of the material connection, so that the thickness minimum is located 5 at the center of the thin material connection. It should be noted, however, that the taper shown in the drawing is strongly exaggerated. In a practical realization of this embodiment, the taper is very slight, so that the distance separating the cutting line segments 82, 83 differs by only a few micrometers between the middle and the ends of the thin material connection. This shape of a constriction 86 has the advantage that it can be produced easily and provides a precise definition of the center of rotation of the flexure pivot. As the thin material connection zone 81 is relatively long in comparison to its thickness, a flexure pivot of this shape will be flexible enough to absorb lateral shocks with only a temporary elastic deformation, as has been explained above.

Figure 4B:
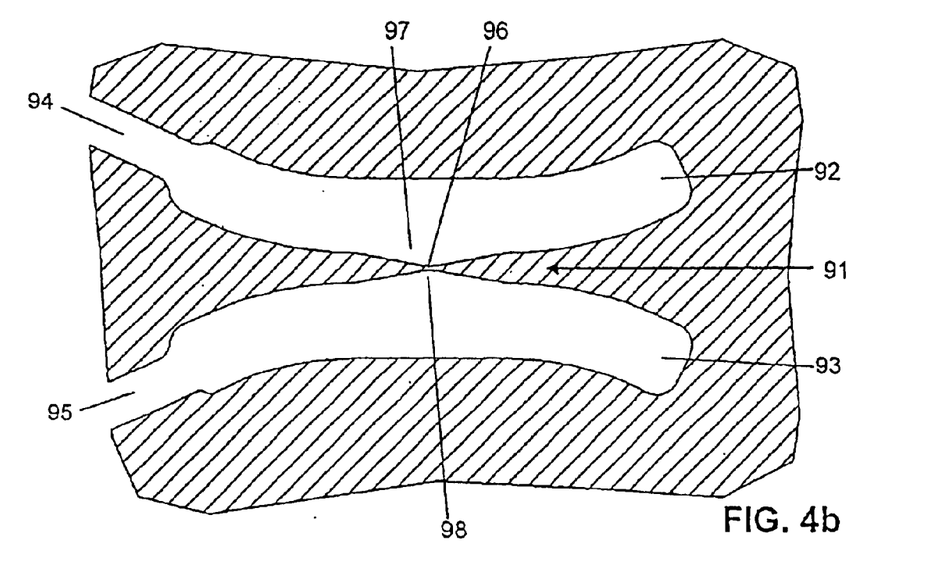
FIG. 4b represents a strongly magnified view of a further developed exemplary version of the thin material connection of FIG. 4a, as seen in a sectional view in the plane of the parallelogram.

FIG. 4b shows a further developed version of the thin material connection illustrated in FIG. 4a. The constriction 96 of the thin material connection zone 91 starts out with a shape similar to the example of FIG. 2b, with the difference that the depressions 97, 98 of the cutting line segments 92, 93 that delimit the thin material connection have a continued narrowing taper towards the middle, for example with a constantly decreasing width of the thin material connection zone 91.

Figure 5:
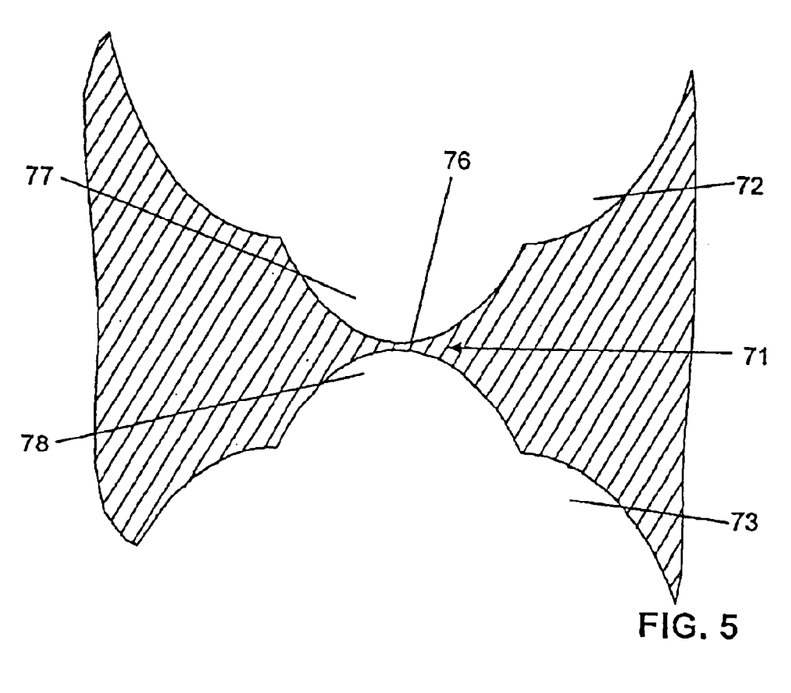
FIG. 5 represents a strongly magnified view of an exemplary embodiment of the thin material connection with approximately constant radii of the material-free spaces delimiting the material connection, as seen in a sectional view in the plane of the parallelogram.

As is self-evident, one can also produce thin material connections for flexure pivots delimited by material free spaces and having a concave shaped surface of substantially constant radius. This is particularly advantageous in a case where the material-free spaces of the material block forming the force-transfer mechanism are produced by a machining process such as, e.g., milling. FIG. 5 illustrates an example of a thin material connection of this kind. The representation is not true to scale insofar as the length of the material connection is compressed in relation to the thickness. The constriction 76 of the thin material connection zone 71 is formed in this case by material-free spaces in the form of arcuate cutouts 72, 73 containing further arcuate cutouts 77, 78 of a second, shorter curvature radius.

Additional exemplary configurations can be implemented where the material-free spaces delimiting the material connection have additional nested levels of depressions or cutouts with progressively smaller curvature radii.

Also possible are configurations with a constant radius of the material-free spaces delimiting the thin material connection with a depressed contour section on only one side forming a constriction of the thin material connection zone.

It is further possible to combine an elongated thin material connection with a constriction where the material-free spaces delimiting the thin material connection form a depressed contour segment of constant radius on one or both sides of the thin material connection.

As is self-evident and has furthermore been discussed in the context of FIG. 1, the flexure pivots containing at least one thin material connection need not extend over the entire width of the material block perpendicular to the plane of the parallelogram. It is possible that the width of the force-concentrating end portions of the coupling elements as well as the lever fulcrums of the force-transfer device is reduced either by recesses entering the material block from the two main surfaces that are parallel to the plane of rotation of the levers, or that levers and coupling elements with or without their associated flexure pivots are divided in two by recesses extending in the median plane of the material block.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Flexure pivot in the form of a thin material connection by which solid material portions are flexibly connected, for use in a force-transfer mechanism with a stationary portion and with a lever arrangement comprising:

at least one reduction lever serving to transmit a force to a measuring transducer;

at least one coupling element serving to introduce an input force into the lever arrangement, said coupling element being stiff against lengthwise deformation but flexible with regard to bending and having at least one thin material connection; and, a flexible fulcrum pivot for supporting the at least one lever on the stationary portion and/or on a preceding lever, the flexible fulcrum pivot comprising:

a thin material connection, said flexible fulcrum pivot being a flexure pivot formed by adjacent material-free spaces and containing at least one thin material connection zone delimited by concave-shaped surfaces facing material-free spaces, wherein at least one of the material-free spaces delimiting the thin material connection zone has a shape that creates a constriction of the thin material connection zone.

2. Flexure pivot in the form of a thin material connection according to claim 1, wherein a center of rotation of the flexure pivot lies in an area of the constriction.

3. Flexure pivot in the form of a thin material connection according to claim 1, wherein the flexure pivot is an integral part of a material block and the material-free spaces are formed by narrow line cuts traversing the material block perpendicularly to its main plane.

4. Flexure pivot in the form of a thin material connection according to claim 1, wherein the flexure pivot is an integral part of a material block and the material-free spaces are hollowed out of the material block by machine tools.

5. Flexure pivot in the form of a thin material connection according to claim 1, wherein the concave-shaped surfaces facing material-free spaces delimiting the thin material connection zone have an elongated shape and form a constriction of the thin material connection, said constriction being shaped with a constant narrowing taper towards a middle of the thin material connection.

6. Flexure pivot in the form of a thin material connection according to claim 1 wherein the concave-shaped surfaces facing material-free spaces delimiting the thin material connection have an elongated shape, wherein at least one depression of the material-free spaces delimiting the thin material connection zone forms a constriction of the thin material connection zone, said constriction being shaped with a constant narrowing taper towards a middle of the thin material connection zone.

7. Flexure pivot in the form of a thin material connection according to claim 1, wherein each of the material-free spaces delimiting the thin material connection zone is bounded by an arcuate cutout with a first curvature radius in which an arcuate cutout with a second, smaller curvature radius is imbedded.

8. Flexure pivot in the form of a thin material connection according to claim 7, wherein an arcuate depression of the material-free spaces delimiting the thin material connection contains further arcuate depressions with significantly stronger curvatures.

9. Flexure pivot in the form of a thin material connection according to claim 1, wherein the concave-shaped surfaces facing material-free spaces delimiting the thin material connection zone have an elongated shape with at least one depression forming a constriction of a mid-portion of the thin material connection zone.

10. Flexure pivot in the form of a thin material connection according to claim 9, wherein an arcuate depression of the material-free spaces delimiting the thin material connection contains further arcuate depressions with significantly stronger curvatures.

11. Force-transfer mechanism for a force-measuring device, with a stationary portion, and with a lever arrangement comprising:
at least one reduction lever serving to transmit a force to a measuring transducer;
at least one coupling element serving to introduce an input force into the lever arrangement, said coupling element being stiff against lengthwise deformation but flexible with regard to bending and having at least one thin material connection; and
a flexible fulcrum pivot for supporting the at least one lever on the stationary portion and/or on a preceding lever, the flexible fulcrum pivot comprising:
a thin material connection, wherein the thin material connection comprises at least one thin material connection zone, that is delimited by concave-shaped surfaces facing material-free spaces, wherein at least one of the material-free spaces delimiting the thin material connection zone has a shape that creates a constriction of the thin material connection zone.

12. Force-transfer mechanism for a force-measuring device according to claim 11, wherein a center of rotation of the flexible fulcrum pivot lies in an area of the constriction.

13. Force-transfer mechanism according to claim 11, wherein the concave-shaped surfaces facing material-free spaces delimiting the thin material connection have an elongated shape and form a constriction of the thin material connection, said constriction being shaped with a constant narrowing taper towards a middle of the thin material connection zone.

14. Force-transfer mechanism according to claim 11, wherein the concave-shaped surfaces facing material-free spaces delimiting the thin material connection zone have an elongated shape, wherein contour depressions of the material-free spaces delimiting the thin material connection form a constriction of the thin material connection zone, said constriction being shaped with a constant narrowing taper towards the middle of the thin material connection zone.

15. Force-transfer mechanism according to claim 11, wherein each of the material-free spaces delimiting the thin material connection zone is bounded by an arcuate cutout with a first radius in which an arcuate cutout with a second, smaller radius is imbedded.

16. Force-transfer mechanism according to claim 11, wherein the material cross-section of at least one force-concentrating end portion of a coupling element and of at least one fulcrum of the at least one lever is reduced by lateral recesses originating from main surfaces of the material block which are parallel to a plane of rotation of the at least one lever and/or wherein the at least one lever and/or its respective lever fulcrum and/or the at least one coupling element and/or its respective force-concentrating end portion are divided in two.

17. Force-transfer mechanism according to claim 11, in combination with a balance used as the force-measuring device.

18. Force-transfer mechanism according to claim 11, wherein the concave-shaped surfaces facing material-free spaces delimiting the thin material connection zone have an elongated shape with at least one depression forming a constriction of a mid-portion of the thin material connection zone.

19. Force-transfer mechanism according to claim 18, wherein an arcuate contour depression of the material-free spaces delimiting the thin material connection zone contains further arcuate contour depressions with significantly stronger curvatures.

20. Force-transfer mechanism for a force-measuring device according to claim 11, wherein the lever arrangement and at least one coupling element are integral parts of a material block.

21. Force-transfer mechanism for a force-measuring device according to claim 20, wherein the material-free spaces are formed by narrow line cuts traversing the material block perpendicularly relative to a plane of rotation of the at least one reduction lever.

22. Force-transfer mechanism according to claim 20, wherein the material-free spaces are hollow spaces formed in the material block by machine tools.

23. Force-transfer mechanism for a force-measuring device according to claim 11, wherein the force-transfer mechanism is an integral part of a material block.

24. Force-transfer mechanism for a force-measuring device according to claim 23, wherein the material-free spaces are formed by narrow line cuts traversing the material block perpendicularly relative to a plane of rotation of the at least one reduction lever.

25. Force-transfer mechanism according to claim 23, wherein the material-free spaces are hollow spaces formed in the material block by machine tools.

26. Flexure pivot in the form of a thin material connection by which solid material portions are flexibly connected, for use in a force-transfer mechanism with a stationary portion and with a lever arrangement comprising:
at least one reduction lever serving to transmit a force to a measuring transducer;
at least one coupling element serving to introduce an input force into the lever arrangement, said coupling element being stiff against lengthwise deformation but flexible with regard to bending and having at least one thin material connection: and,
a flexible fulcrum pivot for supporting the at least one lever on the stationary portion and/or on a preceding lever; wherein
the at least one coupling element comprises a thin material connection formed by adjacent material-free spaces and including at least one thin material connection zone delimited by concave-shaped surfaces facing material-free spaces, wherein at least one of the material-free spaces delimiting the thin material connection zone has a shape that creates a constriction of the thin material connection zone.

27. Flexure pivot in the form of a thin material connection according to claim 26, wherein a center of rotation of the flexure pivot lies in an area of the constriction.

28. Flexure pivot in the form of a thin material connection according to claim 26, wherein the flexure pivot is an integral part of a material block and the material-free spaces are formed by narrow line cuts traversing the material block perpendicularly to its main plane.

29. Flexure pivot in the form of a thin material connection according to claim 26, wherein the flexure pivot is an integral part of a material block and the material-free spaces are hollowed out of the material block by machine tools.

30. Flexure pivot in the form of a thin material connection according to claim 26, wherein the concave-shaped surfaces facing material-free spaces delimiting the thin material connection zone have an elongated shape and form a constriction of the thin material connection, said constriction being shaped with a constant narrowing taper towards a middle of the thin material connection.

31. Flexure pivot in the form of a thin material connection according to claim 26, wherein the concave-shaped surfaces facing material-free spaces delimiting the thin material connection have an elongated shape, wherein at least one depression of the material-free spaces delimiting the thin material connection zone forms a constriction of the thin material connection zone, said constriction being shaped with a constant narrowing taper towards a middle of the thin material connection zone.

32. The flexure pivot of claim 26, wherein the flexible fulcrum pivot comprises a thin material connection formed by adjacent material-free spaces and including at least one thin material connection zone delimited by concave-shaped surfaces facing material-free spaces, wherein at least one of the material-free spaces delimiting the thin material connection zone has a shape that creates a constriction of the thin material connection zone.

33. Flexure pivot in the form of a thin material connection according to claim 26, wherein the concave-shaped surfaces facing material-free spaces delimiting the thin material connection zone have an elongated shape with at least one depression forming a constriction of a mid-point of the thin material connection zone.

34. Flexure pivot in the form of a thin material connection according to claim 33, wherein an arcuate depression of the material-free spaces delimiting the thin material connection contains further arcuate depressions with significantly stronger curvatures.

35. Flexure pivot in the form of a thin material connection according to claim 26, wherein each of the material-free spaces delimiting the thin material connection zone is bounded by an arcuate cutout with a first curvature radius in which an arcuate cutout with a second, smaller curvature radius is imbedded.

36. Flexure pivot in the form of a thin material connection according to claim 35, wherein an arcuate depression of the material-free spaces delimiting the thin material connection contains further arcuate depressions with significantly stronger curvatures.

37. Force-transfer mechanism for a force-measuring device, with a stationary portion, and with a lever arrangement comprising:
   at least one reduction lever serving to transmit a force to a measuring transducer;
   at least one coupling element serving to introduce an input force into the lever arrangement, said coupling element being stiff against lengthwise deformation but flexible with regard to bending and having at least on thin material connection; and
   a flexible fulcrum pivot for supporting the at least one lever on the stationary portion and/or on a preceding lever, wherein
   the at least one coupling element comprises a thin material connection including at least one thin material connection zone, that is delimited by concave-shaped surfaces facing material-free spaces, wherein at least one of the material-free spaces delimiting the thin material connection zone has a shape that creates a constriction of the thin material connection zone.

38. Force-transfer mechanism for a force-measuring device according to claim 37, wherein a center of rotation of the flexible fulcrum pivot lies in an area of the constriction.

39. Force-transfer mechanism for a force-measuring device according to claim 46, wherein the material-free spaces are formed by narrow line cuts traversing the material block perpendicularly relative to a plane of rotation of the at least one reduction lever.

40. Force-transfer mechanism according to claim 37, wherein the concave-shaped surfaces facing material-free spaces delimiting the thin material connection have an elongated shape and form a constriction of the thin material connection, said constriction being shaped with a constant narrowing taper towards a middle of the thin material connection zone.

41. Force-transfer mechanism according to claim 37, wherein the concave-shaped surfaces facing material-free spaces delimiting the thin material connection zone have an elongated shape, wherein contour depressions of the material-free spaces delimiting the thin material connection form a constriction of the thin material connection zone, said constriction being shaped with a constant narrowing taper towards the middle of the thin material connection zone.

42. Force-transfer mechanism according to claim 37, wherein each of the material-free spaces delimiting the thin material connection zone is bounded by an arcuate cutout with a first radius in which an arcuate cutout with a second, smaller radius is imbedded.

43. Force-transfer mechanism according to claim 37, wherein the material cross-section of at least one force-concentrating end portion of a coupling element and of at least one fulcrum of the at least one lever is reduced by lateral recesses originating from main surfaces of the material block which are parallel to a plane of rotation of the at least one lever and/or wherein the at least one lever and/or its respective lever fulcrum and/or the at least one coupling element and/or its respective force-concentrating end portion are divided in two.

44. Force-transfer mechanism according to claim 37, in combination with a balance used as the force-measuring device.

45. Force-transfer mechanism according to claim 37, wherein the flexible fulcrum pivot comprises a thin material connection including at least one thin material connection zone, that is delimited by concave-shaped surfaces facing material-free spaces, wherein at least one of the material-free spaces delimiting the thin material connection zone has a shape that creates a constriction of the thin material connection zone.

46. Force-transfer mechanism for a force-measuring device according to claim 37, wherein the lever arrangement and at least one coupling element are integral parts of a material block.

47. Force-transfer mechanism according to claim 39, wherein the material-free spaces are hollow spaces formed in the material block by machine tools.

48. Force-transfer mechanism according to claim 37 wherein the concave-shaped surfaces facing material-free spaces delimiting the thin material connection zone have an elongated shape with at least one depression forming a constriction of a mid-portion of the thin material connection zone.

49. Force-transfer mechanism according to claim 48, wherein an arcuate contour depression of the material-free spaces delimiting the thin material connection zone contains further arcuate contour depressions with significantly stronger curvatures.

50. Force-transfer mechanism for a force-measuring device according to claim 37, wherein the force-transfer mechanism is an integral part of a material block.

51. Force-transfer mechanism for a force-measuring device according to claim 50, wherein the material-free spaces are formed by narrow line cuts traversing the material block perpendicularly relative to a plane of rotation of the at least one reduction lever.

52. Force-transfer mechanism according to claim 50, wherein the material-free spaces are hollow spaces formed in the material block by machine tools.

* * * * *